(12) United States Patent
Rosberg

(10) Patent No.: US 10,904,718 B2
(45) Date of Patent: Jan. 26, 2021

(54) TELECOMMUNICATIONS SYSTEM

(71) Applicant: Rosberg System AS, Karmsund (NO)

(72) Inventor: Odd Helge Rosberg, Karmsund (NO)

(73) Assignee: Rosberg System AS, Karmsund (NO)

( * ) Notice: Subject to any disclaimer, the term of this patent is extended or adjusted under 35 U.S.C. 154(b) by 0 days.

(21) Appl. No.: 15/034,557

(22) PCT Filed: Nov. 11, 2014

(86) PCT No.: PCT/EP2014/074295
§ 371 (c)(1),
(2) Date: May 5, 2016

(87) PCT Pub. No.: WO2015/067824
PCT Pub. Date: May 14, 2015

(65) Prior Publication Data
US 2016/0277905 A1     Sep. 22, 2016

(30) Foreign Application Priority Data

Nov. 11, 2013  (GB) .................................. 1319874.2

(51) Int. Cl.
*H04W 4/14*       (2009.01)
*H04L 12/58*      (2006.01)

(52) U.S. Cl.
CPC ............ *H04W 4/14* (2013.01); *H04L 51/063* (2013.01); *H04L 51/12* (2013.01); *H04L 51/18* (2013.01)

(58) Field of Classification Search
CPC ........ H04W 4/14; H04L 51/063; H04L 51/12; H04L 51/18
See application file for complete search history.

(56) References Cited

U.S. PATENT DOCUMENTS

| | | | |
|---|---|---|---|
| 6,052,709 A | 4/2000 | Paul | |
| 8,090,393 B1 | 1/2012 | Whitehouse | |
| 8,635,278 B2* | 1/2014 | Stern | H04L 12/5815 379/93.02 |
| 8,839,401 B2* | 9/2014 | Starink | H04L 63/0281 726/11 |
| 2002/0129111 A1 | 9/2002 | Cooper | |
| 2002/0174185 A1 | 11/2002 | Rawat | |
| 2008/0004049 A1* | 1/2008 | Yigang | H04L 51/12 455/466 |
| 2008/0004053 A1 | 1/2008 | Kim | |
| 2008/0222728 A1 | 9/2008 | Chavez | |

(Continued)

FOREIGN PATENT DOCUMENTS

EP       2587743 A1    5/2013

OTHER PUBLICATIONS

PCT International Search Report and Written Opinion, dated Feb. 2, 2015.

(Continued)

*Primary Examiner* — Wayne H Cai
(74) *Attorney, Agent, or Firm* — Seyfarth Shaw LLP

(57) ABSTRACT

A system for delivering messages to a mobile device 3 on a mobile telecommunications network comprises a mobile network provider 2 which receives a message for delivery to the mobile device 3 from a sender 1 having a sender address. A server 4 processes the message to remove any malicious content from the message. The processed message is delivered to the mobile device 3.

9 Claims, 2 Drawing Sheets

(56) References Cited

U.S. PATENT DOCUMENTS

| | | | |
|---|---|---|---|
| 2009/0221310 A1* | 9/2009 | Chen ................... | H04L 12/5835 455/466 |
| 2011/0015987 A1* | 1/2011 | Chakraborty .......... | G06Q 30/02 705/14.39 |
| 2011/0106890 A1* | 5/2011 | Karpov ................ | G06Q 10/107 709/206 |
| 2013/0218999 A1* | 8/2013 | Martin .................... | H04L 51/32 709/206 |

OTHER PUBLICATIONS

UK Intellectual Property Office Examination Report, dated Sep. 5, 2015.
UK Intellectual Property Office Search Report, dated Apr. 24, 2014.

\* cited by examiner

TELECOMMUNICATIONS SYSTEM

CROSS REFERENCE TO RELATED APPLICATIONS

The present application is a national stage application of PCT/EP2014/074295, filed Nov. 11, 2014, and claims priority to UK patent application 1319874.2, filed Nov. 11, 2013, the disclosures of which are incorporated herein by reference.

This invention relates to a telecommunications system, in particular for communicating Short Message Service (SMS) messages to mobile telephones.

BACKGROUND

It is possible for SMS messages to contain malignant code. For example an SMS message can contain modem commands, such as AT commands following the Hayes/GSM command set, which will be processed by the modem of the receiving mobile telephone even before the SMS message has reached the operating system level. The GSM AT commands are used to control every aspect of the mobile phone network interface, from network registration, call control and SMS delivery to packet-based data connectivity. The command set is therefore an integral part of mobile network operation.

It is also possible for SMS messages to include an install script or to exploit functionality within the modem or the mobile device. For example, some anti-theft measures use an encrypted SMS including a command at the hardware level, which causes the receiving device to cease operating.

Protecting against such malignant code in SMS messages is difficult because the received code may be actioned before the SMS message has even reached the operating system. The present invention, at least in its preferred embodiments, seeks to address this problem.

BRIEF SUMMARY OF THE DISCLOSURE

In accordance with the present invention there is provided a method for delivering messages to a mobile device on a mobile telecommunications network. The method comprises a mobile network provider receiving a message for delivery to the mobile device from a sender having a sender address. A server processes the message to remove any malicious content from the message. The processed message is delivered to the mobile device.

Typically, the message is a Short Message Service (SMS) message. In some embodiments of the invention the message is an e-mail message. The message may also be a Multimedia Message Service (MMS) message or a service message of the mobile network.

In one embodiment, the processed message is communicated to the mobile network provider and the mobile network provider sends the message to the mobile device as an SMS message. Alternatively, the processed message is sent to the mobile device via internet protocol. The processed message may be sent to the mobile device by the mobile network provider, by the server, or by a further server in data communication with the server.

On receipt of the message for delivery to the mobile device, the mobile network provider may send the message to the mobile device. In this case, the mobile device is configured to reject receipt of the message but to store the sender address of the message. After rejecting receipt of the message, the mobile device may contact the server for delivery of the processed message. The mobile device may associate the delivered processed message with the rejected message by means of at least the sender address.

The mobile device may contact the server by sending a further SMS message to the server containing the sender address. Alternatively, the mobile device may contact the server via internet protocol.

The server may be in data communication with the mobile network provider via a wide area network. The message may be communicated to the server by the mobile network provider via internet protocol. In this way, the server can be protected from malicious content in SMS message format. The wide area network may be the internet. Alternatively, a private wide area network may be used.

The server may request a connection to the mobile device for delivery of the processed message. In embodiments of the invention, the mobile device rejects the connection request. After receipt of the connection request the mobile device may request a connection to the server using pre-stored address information for the server. The server may accept the connection request from the mobile device. The processed message may be delivered via the connection so established.

The server may be physically remote from the mobile network provider. Alternatively, the server may be part of the mobile network infrastructure.

The invention extends to a telecommunications system comprising a mobile network provider, a server and at least one mobile device, wherein the telecommunications system is configured to operate in accordance with the above method.

The invention further extends to data processing apparatus configured to operate as a server in the telecommunications system and to computer software which configures data processing apparatus to operate as a server in the telecommunications system.

The invention further extends to a mobile device configured to operate as a mobile device in the telecommunications system. In particular the mobile device may be configured to reject receipt of SMS messages while storing a sender address of SMS messages sent to the mobile device. The mobile device may be configured to contact a server to retrieve an SMS message following attempted delivery of an SMS message to the mobile device. The invention also extends to computer software which configures a mobile device to operate as such a mobile device.

BRIEF DESCRIPTION OF THE DRAWINGS

Embodiments of the invention are further described hereinafter with reference to the accompanying drawings, in which.

DETAILED DESCRIPTION

Figure 1:
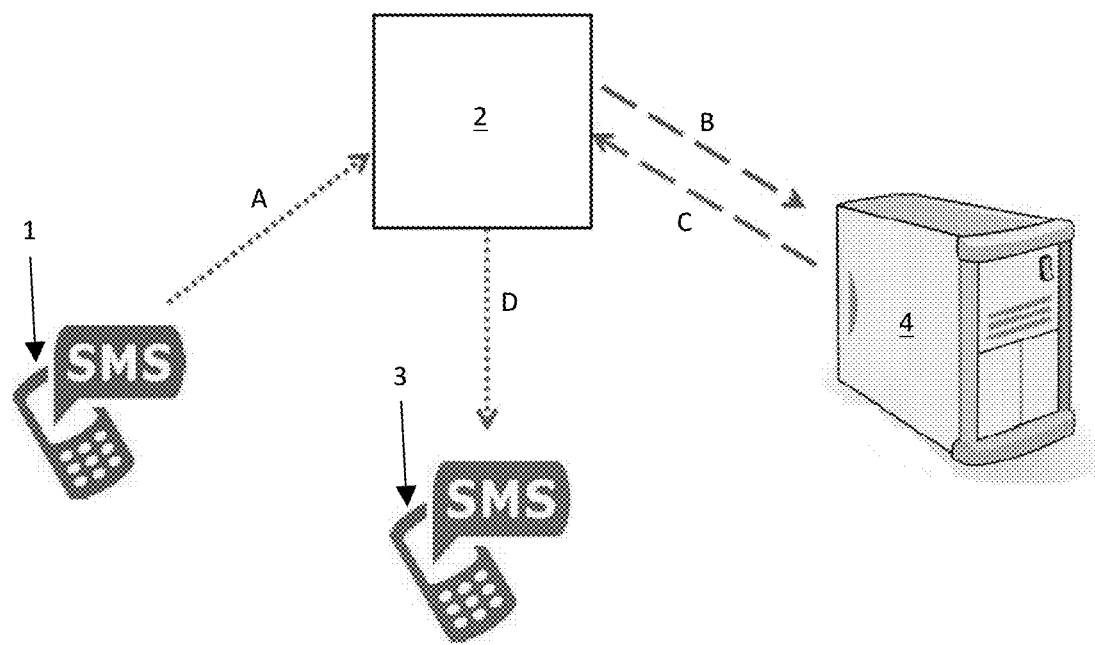
FIG. 1 is a schematic diagram of a telecommunications system according to a first embodiment of the present invention.

While the present invention is susceptible of embodiments in many different forms, there is shown in the drawings, and will herein be described in detail, embodiments, including a preferred embodiment, of the invention with the understanding that the present disclosure is to be considered as an exemplification of the principles of the invention, and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

FIG. 1 is a schematic diagram of a telecommunications system according to a first embodiment of the present invention. In the embodiment of FIG. 1, an SMS message is sent (arrow A) from a mobile device 1 via a mobile network to the network provider 2 using the standard GSM (or other) mobile phone protocol. The SMS message is destined for a second mobile device 3 on the mobile network. However, according to the invention the SMS message is not forwarded directly to the second mobile device. Instead, the SMS message is sent (arrow B) to a third party server 4 where the SMS message is scanned for malicious code. Communication of the SMS message between the network provider 2 and the third party server 4 is via internet protocol. In this way, the content of the SMS message is not received directly by a modem and any malicious code in the message will not be processed by a modem. Any malicious code that is identified is removed from the SMS message and the message is returned (arrow C) to the network provider 2 also via internet protocol. The network provider 2 then forwards (arrow D) the safe message to the second mobile device 3 using the standard GSM (or other) mobile phone protocol.

Figure 2:
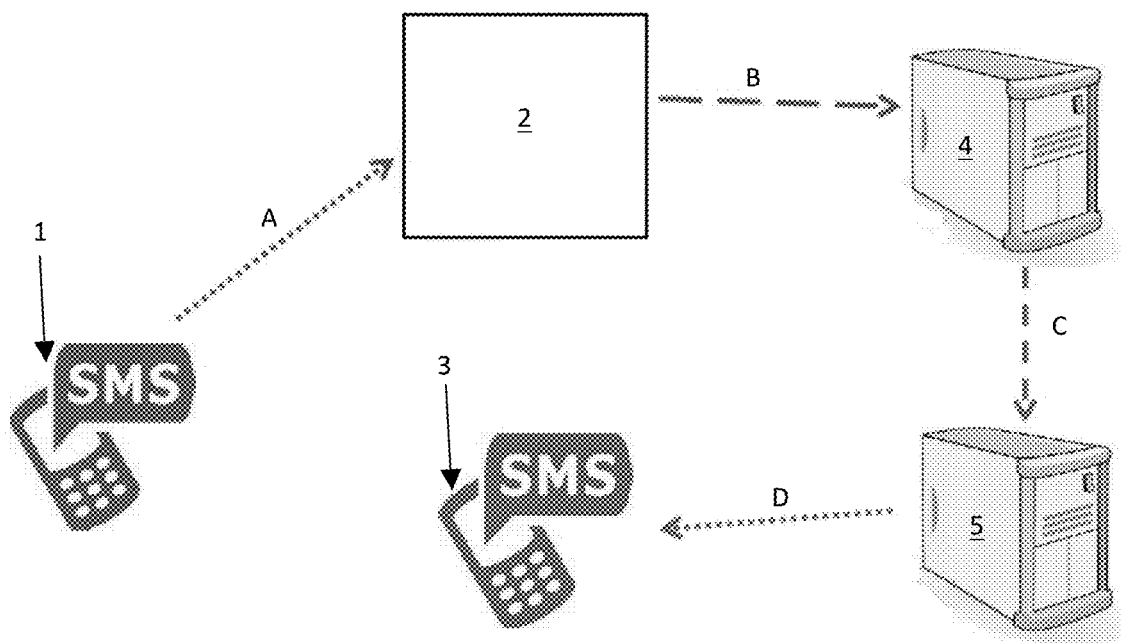
FIG. 2 is a schematic diagram of a telecommunications system according to a second embodiment of the present invention.

FIG. 2 is a schematic diagram of a telecommunications system according to a second embodiment of the present invention. In the embodiment of FIG. 2, an SMS message is sent (arrow A) from a mobile device 1 via a mobile network to the network provider 2 using the standard GSM (or other) mobile phone protocol. The SMS message is destined for a second mobile device 3 on the mobile network. However, according to the invention the SMS message is not forwarded directly to the second mobile device 3. Instead, the SMS message is sent (arrow B) to a third party server 4 where the SMS message is scanned for malicious code. Communication of the SMS message between the network provider 2 and the third party server 4 is via internet protocol. In this way, the content of the SMS message is not received directly by a modem and any malicious code in the message will not be processed by a modem. Any malicious code that is identified is removed from the SMS message and the message is forwarded (arrow C) to the message server 5 also via internet protocol. The message server 5 then forwards (arrow D) the safe message to the second mobile device 3 using the standard GSM (or other) mobile phone protocol.

Figure 3:
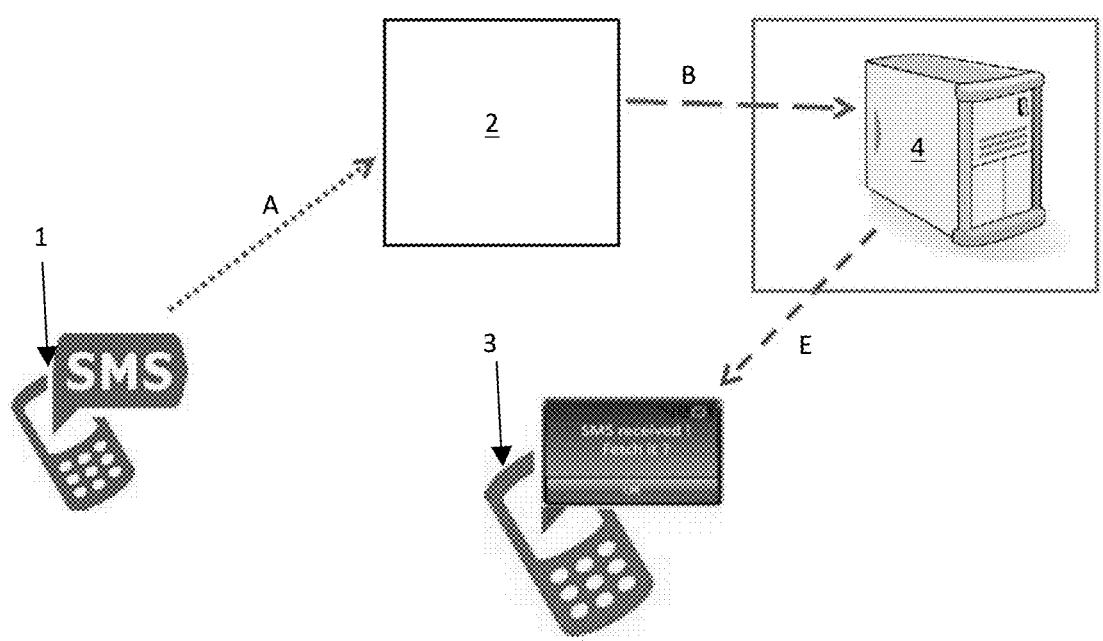
FIG. 3 is a schematic diagram of a telecommunications system according to a third embodiment of the present invention.

FIG. 3 is a schematic diagram of a telecommunications system according to a third embodiment of the present invention. In the embodiment of FIG. 3, an SMS message is sent (arrow A) from a mobile device 1 via a mobile network to the network provider 2 using the standard GSM (or other) mobile phone protocol. The SMS message is destined for a second mobile device 3 on the mobile network. The SMS message is sent (arrow B) to a third party server 4 where the SMS message is scanned for malicious code. Communication of the SMS message between the network provider 2 and the third party server 4 is via internet protocol. In this way, the content of the SMS message is not received directly by a modem and any malicious code in the message will not be processed by a modem. Any malicious code that is identified is removed from the SMS message. In this embodiment, the second mobile device 3 is provided with software, such as an app, with which to retrieve the SMS message from the third party server 4 via internet protocol. The second mobile device 3 is notified that an SMS message has been received. The second mobile device 3 then establishes a connection to the third party server 3 to retrieve the cleaned message from the server 4 via internet protocol.

Notification of the second mobile device 3 that an SMS message is available can be carried out in several ways, as will be described below.

According to one notification system, when the network provider 2 receives the SMS message from the first mobile device 1, the message is forwarded to the third party server 4 for cleaning, but is also forwarded to the second mobile device 3 via the GSM (or other) mobile phone protocol. However, the modem of the second mobile device 3 is configured to reject received SMS messages. Instead, the modem reads only the caller ID, i.e. the mobile subscription identification number (MSIN) or telephone number, from the message header of the SMS message, which will be the telephone number of the first mobile device 1 in this case. This is the sender address. The remainder of the SMS message is not processed by the modem of the second mobile device 3. The second mobile device 3 has therefore received the information that an SMS message sent by the first mobile device 1 is available. The second mobile device 3 therefore contacts the third party server 4 to download the cleaned SMS message via internet protocol.

According to a further notification system, when the network provider 2 receives the SMS message from the first mobile device 1, the message is forwarded to the third party server 4 for cleaning, but is also forwarded to the second mobile device 3 via the GSM (or other) mobile phone protocol. However, the modem of the second mobile device 3 is configured to reject received SMS messages. Instead, the modem reads only the caller ID, i.e. the mobile subscription identification number (MSIN) or telephone number, from the message header of the SMS message, which will be the telephone number of the first mobile device 1 in this case. This is the sender address. The remainder of the SMS message is not processed by the modem of the second mobile device 3. The second mobile device 3 has therefore received the information that an SMS message sent by the first mobile device 1 is available. In this case, the second mobile device 3 creates a second SMS message containing the received MSIN and destined for the third party server 4. The second SMS message may contain a time of receipt of the first SMS message and may be encrypted. The third party server 4 receives the second SMS message and confirms that it originates from the second mobile device 3 for which the first SMS message is destined. The third party server 4 then sends an encrypted and cleaned version of the first SMS message to the second mobile device 3. The second mobile device 3 receives and decrypts the message received from the third party server 4. The modem of the second mobile device 3 may be configured to receive SMS messages only from the third party server 4, identifying the third party server by its MSIN, for example. After decryption, the second mobile device 3 presents the content of the first SMS message to the user as a normal SMS message, having matched the message to the stored MSIN of the first mobile device 1 which sent the first SMS message. In this case, communication between the second mobile device 3 and the third party server 4 is by SMS message only so that internet protocol capability is not necessary for the second mobile device 3.

It should be noted that in the above system, the second mobile device 3 is able to send SMS messages according to the standard GSM (or other) mobile phone protocol and process.

The invention is not limited to SMS messages, but may also be used to enhance the security of "push" e-mail systems. According to this variation, when an e-mail is received at the third party server 4 for delivery to the second mobile device 3, the third party server 4 attempts to make a connection to the second mobile device 3 to deliver the e-mail. In accordance with the method disclosed in WO2010/039041, the second mobile device 3 rejects the connection request. However, the second mobile device 3 identifies that the connection request originated from the third party server 4. The second mobile device 4 therefore contacts the third party server 4 via internet protocol to request a connection, using a predetermined address for the third party server 4 stored in the second mobile device 4. In this way, a malign server cannot force a connection to the second mobile device 3 to deliver malicious e-mail content because the second mobile device 3 will only connect to the third party server 4 for the delivery of e-mail. Once the second mobile device 3 has established the connection to the third party server 4, the e-mail is delivered by the third party server 4. This method may also be used for the delivery of SMS messages via internet protocol, with or without the second mobile device 3 being notified in advance that an SMS message is waiting for delivery. A virtual private network (VPN) connection may be established by the second mobile device 3 with the third party server 4 for additional security.

In summary, a system for delivering messages to a mobile device 3 on a mobile telecommunications network comprises a mobile network provider 2 which receives a message for delivery to the mobile device 3 from a sender 1 having a sender address. A server 4 processes the message to remove any malicious content from the message. The processed message is delivered to the mobile device 3.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for delivering messages to a mobile device on a mobile telecommunications network, the method comprising:
   receiving, by a mobile network provider, a message for delivery to the mobile device from a sender having a sender address;
   directing the message to a server for processing the message to remove malicious modem commands from the message before the message is delivered to the mobile device; and
   delivering the processed message without the malicious modem commands to the mobile device, such that the mobile device does not receive the malicious modem commands,
   wherein the message is a Short Message Service (SMS) message, a Multimedia Message Service (MMS) message, or a service message of a mobile network.

2. A method as claimed in claim 1, wherein the server is in data communication with the mobile network provider via a wide area network and the message is communicated to the server by the mobile network provider via internet protocol.

3. A method as claimed in claim 2, wherein the wide area network is the internet.

4. A method as claimed in claim 1, wherein the server requests a connection to the mobile device for delivery of the processed message, the mobile device rejects the connection request, after receipt of the connection request the mobile device requests a connection to the server using pre-stored address information for the server, the server accepts the connection request from the mobile device and the processed message is delivered via the connection so established.

5. A method as claimed in claim 1, wherein the server is physically remote from the mobile network provider.

6. The method as claimed in claim 1, wherein the step of delivering the processed message without the malicious modem commands to the mobile device includes delivering the processed message without the malicious modem commands to the mobile device using Internet Protocol.

7. A telecommunications system comprising a mobile network provider, a server and at least one mobile device, wherein the telecommunications system is configured to operate in accordance with the method of claim 1.

8. Data processing apparatus configured to operate as a server in the telecommunications system of claim 7.

9. A mobile device configured to operate as a mobile device in the telecommunications system of claim 7.

* * * * *